J. H. BAKER & I. P. BALDWIN.
BEE-HIVE.
No. 186,098. Patented Jan. 9, 1877.
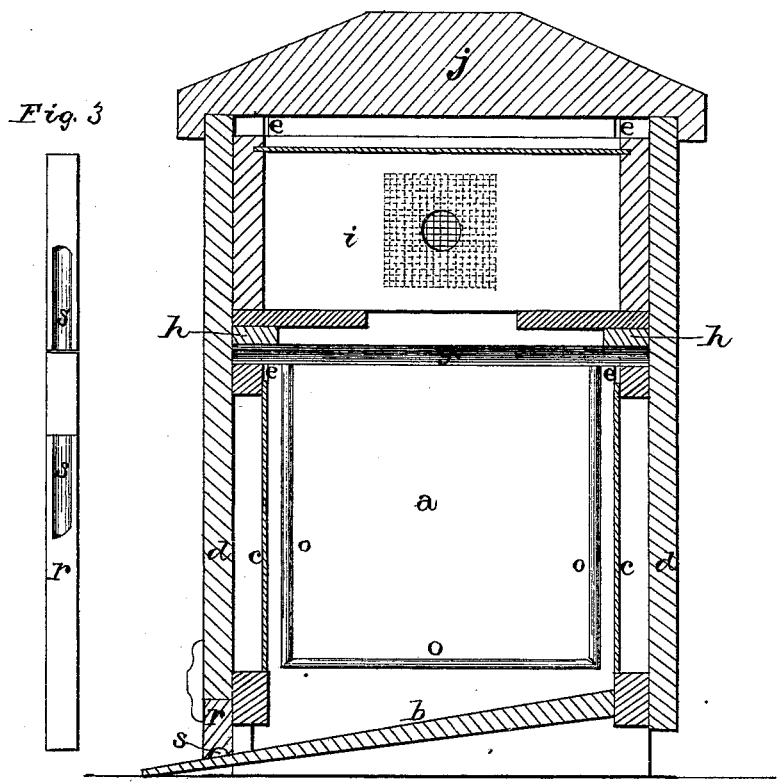
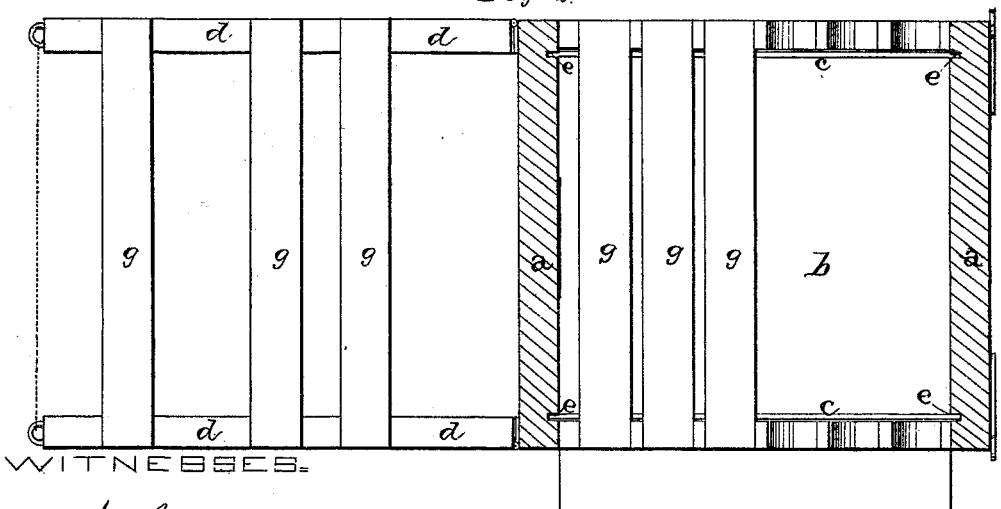

UNITED STATES PATENT OFFICE.

JOHN H. BAKER, OF BROADWAY, AND ISAAC P. BALDWIN, OF MANASSAS, VIRGINIA.

IMPROVEMENT IN BEE-HIVES.

Specification forming part of Letters Patent No. 186,098, dated January 9, 1877; application filed December 2, 1876.

*To all whom it may concern:*

Be it known that we, JOHN H. BAKER and ISAAC P. BALDWIN, respectively of Broadway and Manassas, in the counties of Rockingham and Prince William and State of Virginia, have invented certain new and useful Improvements in Bee-Hives; and we do hereby declare the following to be a full, clear, and exact description of the invention, such as will enable others skilled in the art to which it pertains to make and use it, reference being had to the accompanying drawings, which form part of this specification.

Our invention relates to an improvement in bee-hives; and it consists in the arrangement and combination of parts, that will be more fully described hereinafter, whereby a cheap, simple, and effective hive is produced, that will allow a free access to its interior at all times, permit the bees to be watched, or to see whether moths or millers have gotten in, and enable the doors to be used as a means of hanging the honey-frames on while the lower part of the hive is being inspected.

The accompanying drawings represent our invention.

$a$ represents a rectangular hive, which has an inclined bottom board, $b$, and grooves cut in opposite sides, so as to receive the glass panes $c$. These glasses extend up on two sides of the hull or lower part of the hive, and, when the doors $d$ are opened back, allow the light to shine directly in through the hive, so that the whole interior can be seen, the bees watched at work, and the comb inspected to see whether moths or millers have effected an entrance. In case anything should be seen in the lower part of the hive or among the combs that needs removing, the glass on either side can be raised in its groove $e$ until it strikes the under side of the top pieces $g$ of the comb-frames, thus allowing a long implement to be inserted to remove the objectionable object.

The doors $d$ are so hinged to the frame that they can be swung straight back in a line with the side of the frame, and thus form a hollow square for hanging the comb-frames on when they are being taken from the hive. When the frames are thus suspended between the doors they are protected from all currents and drafts of air, and thus the larvæ are prevented from being chilled or blown from the comb. Placed across the ends of the tops of the comb-frames are the two strips $h$, and upon the top of these strips is placed the honey-box $i$, which has an opening across its bottom, that runs at right angles to the comb-frames, thus allowing the working-bees free access to the box from any comb. Through the side of the frame, at one end of the honey-box, is made an opening, which is covered over with wire-gauze, and through this opening the whole hive can be ventilated. Over the top of the frame is placed the cap J.

In making our comb-frames we use a top piece, $g$, one inch wide, and then use rattan $o$, of suitable size, for the frame. Rattan is not only cheaper than wire, but does not rust, is not affected by heat or cold, is more agreeable to the bees, is porous, so that it will absorb all unnecessary moisture, does not obstruct a view of the comb and bees from the ends, does not crush the bees in being taken out and put in again, and is amply strong enough for all necessary purposes. These rattan frames are made so that they do not come within about a quarter of an inch from the glass at each end, thus allowing room for the working-bees to climb up at the ends without interfering with the brood. The strips $h$ are made one-quarter inch thick, so as to exclude the drones from the honey-box.

After many years' experience in bee-culture, we find that where there are no frames in a hive the bees will always build the brood-combs one inch in thickness, and leave three-eighths of an inch space between each comb. We therefore build our hive so as to accommodate any given number of comb-frames placed one and three-eighths inch apart from center to center, and leave three-eighths of an inch space between each comb and between the comb and side of the hive, and one-quarter of an inch space between the rattan frame and the glass. We also place a narrow strip, one-quarter of an inch thick, across the ends, and on the top of the comb-frames on which the honey-box rests, thus allowing the working-bees free access to every part of the hive, while at the same time excluding the drones from the honey-box altogether.

The advantages of this arrangement are, first, the hive will be filled with comb of the proper size, and the temperature will be kept at the proper degree of heat for raising broods and keeping up the colony; second, the working-bees will be able to protect themselves and the brood from the intrusion of insects; third, the honey-box cannot be sealed to the comb-frames, and consequently may be removed at pleasure without disturbing the bees; fourth, the comb-frames are all accessible, and may be taken out and examined separately without injury to the colony; fifth, the bees, having a house suited to their necessities, will be better satisfied and more prolific, will make more honey, and turn out more and stronger swarms than from any other hive extant.

The entrance-gage $r$, which closes the entrances to the hive, can be so adjusted that the entrance will be so small that the workers can go in and out; but the drones may be excluded entirely, when so desired. In the under side of this gage are made the grooves $s$, in which the moths and millers will lay their eggs, and from which they can be taken and destroyed before they are hatched or are carried into the hive by the bees.

Having thus described our invention, we claim—

The combination of the frame $a$, having grooves $e$, that extend its entire length, and panes $c$, adapted to be raised and lowered in said grooves, with the honey-frames $g$, end pieces $h$, honey-box $i$, cap $j$, and doors $d$, that are adapted to serve as supports for the honey-frames when the frames are taken from the hive for inspection, substantially as shown and described.

In testimony that we claim the foregoing we have hereunto set our hands this 1st day of December, 1876.

J. H. BAKER.
ISAAC P. BALDWIN.

Witnesses:
ROBT. M. BARR,
F. A. LEHMANN.